(12) United States Patent
Yusko et al.

(10) Patent No.: US 9,928,476 B2
(45) Date of Patent: Mar. 27, 2018

(54) PRODUCT INFORMATION MANAGEMENT

(75) Inventors: Jay Alan Yusko, Lombard, IL (US); Michael Brunette, Chicago, IL (US)

(73) Assignee: Information Resources, Inc., Chicago, IL (US)

( * ) Notice: Subject to any disclaimer, the term of this patent is extended or adjusted under 35 U.S.C. 154(b) by 143 days.

(21) Appl. No.: 13/597,734

(22) Filed: Aug. 29, 2012

(65) Prior Publication Data

US 2013/0054419 A1    Feb. 28, 2013

Related U.S. Application Data

(60) Provisional application No. 61/528,617, filed on Aug. 29, 2011.

(51) Int. Cl.
*G06Q 30/06* (2012.01)
*G06Q 10/08* (2012.01)

(52) U.S. Cl.
CPC ....... *G06Q 10/087* (2013.01); *G06Q 30/0601* (2013.01)

(58) Field of Classification Search
CPC ... G06Q 10/087; G06Q 30/0601; G06F 17/30
USPC ............... 705/26.1, 26.61; 707/713
See application file for complete search history.

(56) References Cited

U.S. PATENT DOCUMENTS

| | | | |
|---|---|---|---|
| 2005/0177582 A1* | 8/2005 | Baird-Smith et al. ........ | 707/100 |
| 2005/0289168 A1* | 12/2005 | Green et al. ................... | 707/101 |
| 2007/0283252 A1* | 12/2007 | Stuhec .............. | G06F 17/30731 715/234 |
| 2008/0222003 A1* | 9/2008 | Adstedt et al. .................. | 705/26 |
| 2010/0306198 A1* | 12/2010 | Gadacz ......................... | 707/738 |
| 2011/0137705 A1* | 6/2011 | Srinivasan ............. | G06Q 10/06 705/7.28 |
| 2011/0289026 A1* | 11/2011 | Kannan .................. | G06Q 30/00 706/12 |

* cited by examiner

*Primary Examiner* — Mila Airapetian
(74) *Attorney, Agent, or Firm* — Strategic Patents, P.C.

(57) ABSTRACT

A product database describing products and attributes associated with the products is identified. Some attributes have values including words. A dictionary including the words is identified. The dictionary is partitioned into synonym classes of words. A representative word from the dictionary is selected. Replacement rules are identified, each of which replace a target word with the target word's corresponding representative. For each product in the database, the replacement rules are applied to produce a standardized product database.

19 Claims, 3 Drawing Sheets

| ... | SKU | Flavor/Scent | Color | Size | ... |
|---|---|---|---|---|---|
| | 100001 | BBQ | - | 1 1/8 oz. | |
| | 12359 | Cherry | Fire Engine Red | - | |
| | 31415 | - | Black | 15" | |

| ... | SKU | Flavor/Scent | Color | Size | ... |
|---|---|---|---|---|---|
| | 100001 | BBQ | - | 1 1/8 oz. | |
| | 12359 | Cherry | Fire Engine Red | - | |
| | 31415 | - | Black | 15" | |

PRODUCT INFORMATION MANAGEMENT

RELATED APPLICATIONS

This application claims the benefit of provisional application 61/528,617, filed Aug. 29, 2011, the entire contents of which are hereby incorporated by reference.

TECHNICAL FIELD

This document relates to managing information associated with one or more products.

BACKGROUND

Information about a product includes descriptions of its various attributes. For example, attributes of a deodorant product may include its scent (or lack thereof), its active ingredients or inactive ingredients, its intended manner of use (e.g., spray on, roll on, etc.), among many other attributes.

These attributes are often stored in a database, along with attributes for many other products. Large databases can include descriptions of as many as 2.2 million products or more. In combination with other data, such as sales data, these databases can support various analytical techniques, such as identifying market trends, gauging the success of a product (or group of products) relative to others, etc.

However, entering product descriptions into such databases can be an error-prone process, causing the data in a product database to be inaccurate or inconsistent. Such inaccuracies or inconsistencies limit the effectiveness of analytic techniques applied to the data.

SUMMARY

In general, in one aspect, producing a standardized product database includes: identifying a product database describing a plurality of products, and for each product, a plurality of attributes associated with the product, with each attribute having a value that includes a word; identifying a dictionary comprising each word that appears as a value of at least one attribute of at least one product in the database; partitioning the dictionary into synonym classes of words; selecting a representative word from each of the synonym classes, thereby associating each word in the dictionary with a corresponding representative; identifying a collection of replacement rules, each of which replace a target word with the target word's corresponding representative; and for each product in the database, applying the replacement rules to one or more attributes of the product, thereby producing a standardized product database.

Implementations may have one or more of the following features. Producing the standardized product database also includes: using the replacement rules, replacing each word in the dictionary with its corresponding representative, thereby producing a standardized dictionary; adding a new record to the database corresponding to a new product, wherein the new record includes attribute fields; and selecting values for the attribute fields from the standardized dictionary. Producing the standardized product database also includes: defining synonym classes of phrases in the dictionary. The replacement rules include global rules, multi-word phrase rules, attribute constant rules, and single-word replacement rules; the global rules are applied before the multi-word phrase rules; the multi-word phrase rules are applied before the attribute constant rules; and the attribute constant rules are applied before the single-word replacement rules. The rules are applied repeatedly until a pre-determined condition is met. The pre-determined condition includes the conditions that: each rule is applied at once, and there occurs an iteration of applying each of the rules such that the rules collectively fail to change at least one attribute value. The pre-determined condition includes the application of the rules a pre-determined number of times. The new record is added based on detecting a new product in external data selected from the group consisting of: sales data from a retail outlet, inventory data from a retail outlet, a new product announcement from a media outlet, and a communication from a product manufacturer or affiliate. Adding the new record includes: automatically identifying a preliminary record based on raw external data; applying the replacement rules to the preliminary record, thereby producing a transformed record; submitting the transformed record to a human for review; in response to human input, discarding the transformed record and receiving a new replacement rule from the human; and applying the new replacement rule to the preliminary record, thereby producing the new record.

The above may be expressed as methods, systems, non-transitory computer readable media, and other forms.

DESCRIPTION OF DRAWINGS

Embodiments of the invention described herein may be understood by reference to the following figures, which are provided by way of example and not of limitation.

Like references numbers refer to like structures.

DETAILED DESCRIPTION

Figures 1, 2:
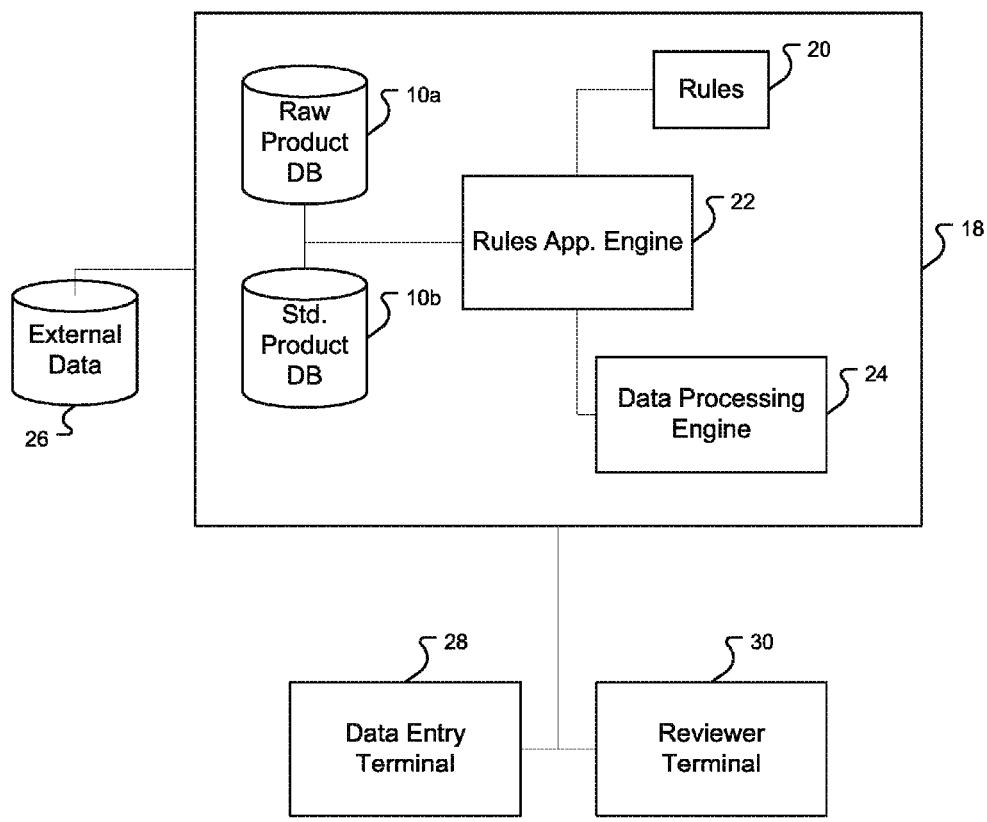
FIG. 1 is a schematic depiction of an exemplary product database.
FIG. 2 is a schematic depiction of a product information management system.

FIG. 1 is a schematic depiction of an exemplary product database. The product database 10 includes records for a number of products, each record 12 shown schematically in FIG. 1 as a separate row. Any particular record includes fields for a number of attributes 14. An attribute describes any aspect of a product or the way in which a product is marketed. For example, FIG. 1 shows attributes for the flavor or scent of a product, the product's color, the product's size, and the product's stock-keeping unit (SKU) code. Several other attributes are possible.

Each attribute 14 can (but need not) have an associated value 14. In some implementations, attributes that are likely to affect consumer preferences or behavior are more likely to have values. Conversely, attributes that are unlikely to affect consumer preferences (or that are logically or practically impossible, given the product) are less likely to have values.

For example, if the first row of the exemplary product database 10 describes a snack, such as a bag of chips, then its attributes might include values for a flavor (e.g., BBQ) and a size (e.g., 1⅛ ounces), but the "color" attribute might not make sense to describe the product. This reflects the idea that consumers may prefer one flavor of chips to another, or may buy different sized bags of chips on different occasions, but tend not to buy chips because they are a certain color. Thus, the "color" attribute does not have a value in the exemplary product database 10.

Similarly, if the second row of the exemplary product database 10 describes a particular laptop case, then its attributes might include values for color and size, but the "flavor/scent" attribute makes little sense and therefore does not have a value.

Finally, if the third row of the exemplary product database 10 describes a particular lipstick product, then its attributes might include values for flavor/scent, color, and size. Note that the value of the flavor/scent is "none," which should not be confused with the value not existing. In this case, for example, the value "none" could be used to distinguish from other flavored or scented lipsticks.

Attribute values can be of various types. It is often useful to specify the type of an attribute, independent of its value (if any). In some implementations, attribute types include text, numerical, and multi-valued. A "text" attribute takes alphanumeric values, such as "orange," "XL," or "B2B." Numerical attributes take strictly numerical values, such as "37" or "0." In some implementations, attribute values can also include other types of values beyond alphanumerical, including other data structures, graphic, audio, or executable files (including pointers to any of the above).

For large product databases 10, maintaining consistency of how the values 14 are expressed may be challenging. For example, some records are included in the database based on human input, but humans may make typographical or other errors from time to time. Additionally, different humans might decide to use synonymous (but textually different) ways to describe attributes. For example, the values "BBQ" and "Barbeque" might be intended to mean the same thing, but might also be treated as different values by a computer carrying out an automated analytical task.

A reverse problem can also occur, in which a single value can mean several different things, depending on its context. This can occur, for example, when data for records is supplied by individual manufacturers who use their own mutually inconsistent terminology or abbreviations. For example, one manufacturer may provide a value of "reg." to describe the size of a product. Here, "reg." might mean "regular," as opposed to small or large. But another manufacturer might use "reg." to mean "regional," as opposed to local or national. And still another manufacturer might use "reg." to mean "registration required."

In yet another example, the words "blue" and "bleu" may present similar problems. For example, if the word "bleu" appears as a value for the color attribute, it is likely to be a misspelling of "blue." However, if the phrase "blue cheese" appears as a value for the flavor/scent attribute, then it is likely a misspelling of "bleu cheese." Moreover, it is conceivable that at some moment a particular manufacturer sells a cheese spread containing blue food coloring under the product name "blue cheese."

The techniques described below help mitigate these and other problems. In particular, the techniques described below can be used to standardize an existing product database, add records to an already-standardized database while maintaining consistency, and other things.

FIG. 2 is a block diagram of a product information management system. The product information management system 18 includes a raw product database 10a, a standardized product database 10b, a collection of replacement rules 20, a rules application engine 22, and a data processing engine 24. The system 18 is in data communication with one or more external data sources 26, and one or more data entry terminals 28. The system 18 is also in data communication with one or more reviewer terminals 30.

The components of the product information management system 18 may be implemented as hardware, software, or a combination of hardware and software. The data communication may be implemented in any known manner, such as using a direct wired or wireless connection between components, indirect communication via other components within the system 18 or outside the system 18, including communication over a computer network such as a local area network or a wide area network, such as the Internet.

The raw product database 10a includes a product database for which attribute values are recorded exactly as they were originally provided. As new products and corresponding attribute values are identified (e.g., as described more fully below), these products, attributes, and values are recorded in the raw product database 10a.

The standardized product database 10b includes a product database for which the attribute values have been modified according to the techniques described below. Such a database employs a standardized lexicon (perhaps with known exceptions) for values of attributes, and is therefore more amenable to various analyses.

The collection of replacement rules 20 includes one or more rules for transforming values of attributes. As described more fully below, the collection of rules 20 is used to transform the raw product database 10a into the standardized product database 10b.

A rule is any unambiguous prescription for replacing one value or set of values for another value or set of values. A rule has one or more conditions, which collectively determine when the rule is applied. For example, one rule might include replacing an ampersand ("&") with the word "and." Thus, a (raw) value of "salt & pepper" in the flavor/scent attribute for a product would be transformed to "salt and pepper" under this rule.

Rules may also involve exceptions, exceptions to exceptions, etc. For example, the previous rule might be further refined to include the exception that the word "M&Ms" should not be transformed to "M and Ms" in values of any attribute.

The conditions for rules can implicate not just attribute values, but other contextual information such as the attributes or products in which the values appear. For example, a rule might include replacing a "bleu" with "blue," but only when "bleu" appears as a value for the color attribute. A separate rule might include replacing "blue" with "bleu," but only when "blue" appears as a value for the flavor/scent attribute. Each of these rules can have exceptions, leaving the phrase "blue cheese" unchanged when it appears as the flavor/scent value of a record having a particular value (or values) for the manufacturer, SKU, or other field (or combination of fields) unrelated to flavor/scent.

Rules may involve multi-word phrases. For example, a rule might include replacing the entire phrase "blue cheese" with "bleu cheese." This rule would not replace the phrase "blue raspberry" with "bleu raspberry," for example.

One example in which the rules can be deployed is to create a standardized dictionary of words or phrases. For example, certain words may be regarded as equivalent—for example, "BBQ" and "Barbeque." These equivalences may be limited only to certain contexts—for example, "reg." being considered to "regular" only in the context of a product's size.

The rules application engine 22 is operable to apply the rules 20. In some implementations, the rules 20 are applied to an existing raw product database 10a or portion thereof. In some implementations, the rules 20 are applied to incoming records as they are included in the raw product database 10a. In some implementations, the rules 20 are applied on a pre-determined schedule to all previously un-processed records in the raw product database 10a. In some implementations, the output of the rules application engine 22 is records that are included in the standardized product database 10b. In some implementations, the output of the rules application engine 22 is presented to a human reviewer before inclusion in the standardized product database.

The data processing engine 24 is operable to process data including (but not limited to) the external data 26. In some implementations, the data processing engine 24 can detect new products (and possibly, but not necessarily, corresponding attributes or values). For example, in some implementations, the external data 26 includes sales data from various retail outlets. In this case, the appearance of product sales that previously did not appear indicates the introduction of the new product into the market.

In some implementations, the external data 26 includes one or more media outlets (e.g., online media outlets) where new products are commonly announced. For example, these media outlets can be manually monitored (e.g., by one or more people), or automatically monitored (e.g., by one or more processes in the data processing engine 24 configured to detect keywords associated with new product launches.)

In some implementations, the external data 26 includes direct communications from product manufacturers or their affiliates to the system 18, indicating a new product has or soon will enter the market.

In some implementations, the external data 26 includes one or more feeds, such as RSS ("really simple syndication") feeds, social media feeds, and the like, from any source, including the sources mentioned above.

Subject to the reviewing procedures below, the output of the data processing engine 24 is (possibly incomplete) records that may be included in the raw product database 10a.

The data entry terminal 28 is operable to allow a human to modify or supplement any of the data automatically acquired by the data processing engine. In some implementations, an administrator of the system 18 can institute policies setting forth when data may be reviewed, must be reviewed, must not be reviewed, etc., prior to its inclusion in the raw product database 10a. In some implementations, a human may also propose new rules 20 or modifications to the rules 20.

The data entry terminal may include virtually any device capable of alphanumeric data entry. In some implementations, the data entry terminal 28 is remote from the system 18. For example, the data entry terminal may include a portable or hand-held computing device equipped with a mobile data connection. Thus, in the course of a product audit at a retailer, a human can use such a data entry terminal 28 to enter product information for a newly-launched product while on-site at the retailer. In some implementations, the data entry terminal 28 also includes a camera for acquiring product images. Such images may be included among the external data 26.

The reviewer terminal 30 is operable to allow a human to modify or supplement raw output of the data processing engine 24, or data supplied by a human via the data entry terminal 28, approve or modify proposed rules or proposed changes to existing rules 20, modify existing rules 20, etc. In some implementations, an administrator of the system 18 can institute policies setting forth when input from the data entry terminal may be reviewed, must be reviewed, must not be reviewed, etc., prior to its inclusion in the raw product database 10a or rules 20.

Figure 3:
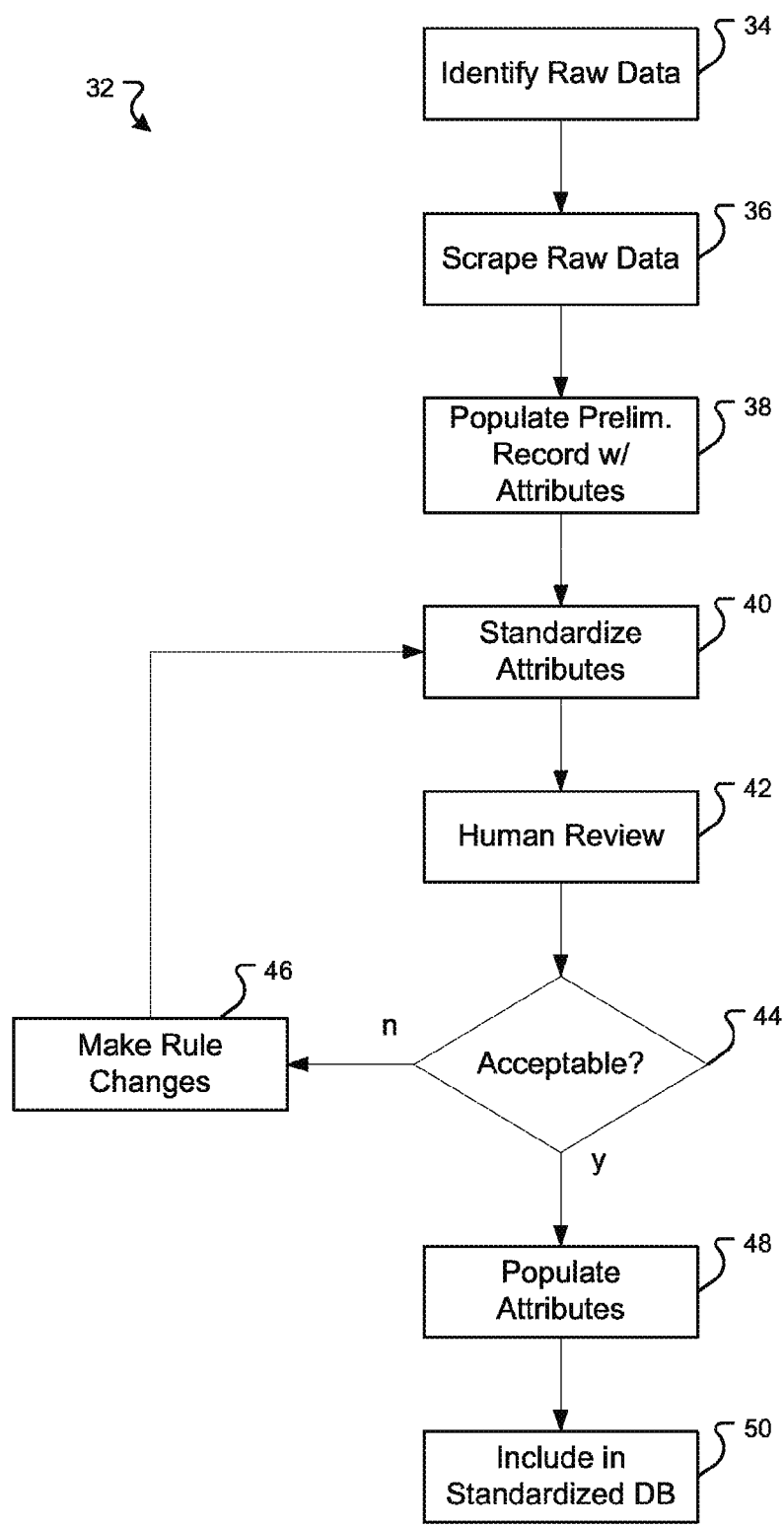
FIG. 3 is a flowchart for adding a record to a standardized database.

FIG. 3 is a flowchart for adding a record to a standardized database. In some implementations, the process 32 is carried out by the product information management system 18.

In step 34, raw data identified. In some implementations, the raw data is identified in the external data 26. Next, the raw data is scraped to identify information of products described in the data, if any (step 36). In some implementations, the information may include attributes and/or corresponding values. In some implementations, other contextual information can be identified, such as the type of product described, or a family of products that includes the product. "Scraping" refers to a collection of techniques applicable to extract specific data from electronic documents.

For example, for text-based raw data, scraping techniques include extracting parts of the raw data that match certain regular expressions, utilizing metadata (if any) such as markup language tags, document object models, and the like. For example, metadata indicating a source of the raw data may be useful in determining, e.g., a brand name of the product the data describes.

Similarly, for image-based raw data, scraping techniques include analyzing metadata, extracting text data via optical character recognition techniques (and subsequently applying the text-based scraping techniques described above), image feature detection and extraction, and other machine vision techniques.

Other text-based and image-based scraping techniques are possible.

The particular techniques used, and the particular data sought to be extracted from the raw data, depend on the context in which the method 32 is being deployed. For example, in the context of product identification, one can seek various indicators of typical product attributes, such as brand names or images representing logos, SKU codes, common attribute names (e.g., size, flavor/scent, color, etc.), ingredient lists, etc.

In step 38, a preliminary record is populated with the attribute values scraped from the raw data. For example, if any attribute values were directly identified, then those attribute values are applied to the preliminary record. Similarly, if the product's other contextual information was identified, then that can be used to infer certain attribute values. For example, if the product described by the raw data is a new computer accessory, then the flavor/scent attribute can safely be inferred as irrelevant, even if no other attributes of the computer accessory were scraped.

In another example, the preliminary record of step 38 need not come from external data. For example, in standardizing an existing, previously non-standardized database, then any record from the non-standardized database can be used as a preliminary record in the standardization process 32.

Rules are then applied to the values in the preliminary record (step 40), to standardize the attributes. It is possible that sequentially applying the entire collection rules multiple times may result in continually changing values. For example, a rule might include removing leading zeroes from a numerical attribute. Thus, "0421" becomes "421" under this rule. However, the value "0000421" is only transformed to "000421" with a single application of the rule. Thus, to completely remove all the leading zeros from this value, it may be necessary to apply the rule four times.

Similarly, care may sometimes be warranted with rules involving multi-word phrases. For example, one rule might include changing "blue cheese" to "bleu cheese," and another rule might involve changing "blu" to "blue." Thus, starting with the value "blu cheese," the order in which the rules are applied makes a difference—one order results in "blue cheese" and the other order results in "bleu cheese."

In some implementations, the rules are applied in a pre-determined order. For example, first applying certain pre-determined "global" rules, then applying rules involving multi-word phrases (in increasing or decreasing order of length of phrase), followed by rules involving attribute constants, and finally rules involving word-level replacements.

In some implementations, rules may be applied multiple times. For example, the rules may be applied until some predetermined condition occurs. Such pre-determined condition can include the condition that the rules cause no further changes in values, or that the rules have been applied for a pre-determined threshold number of times, or some other condition.

After applying the rules, the transformed records can be sent to a human or humans to review (step 42). This review provides an opportunity to verify that rules have their intended consequences. If there are attributes having incorrect values, then changes are made to the rules 20, and not the value itself (step 46). Making rule-level changes (rather than value-level chances) helps reduce duplicated effort involved with continually correcting certain attributes whose incorrect values result from recurring errors. Additionally, making rule-level changes helps ensure consistency, insofar as it is possible for humans to miss or introduce errors in attribute values.

After the human review, the attribute value is included in the record (step 48) and the record is included in the standardized product database (step 50).

These techniques may be used to standardize an existing, previously non-standardized product database, as described more fully below.

A collection of words or phrases that are all considered mutually equivalent (perhaps only in specified contexts) is called an "equivalence class" or "synonym class." Thus, the synonym class of "BBQ" might include the words "Barbecue," "Barbeque," "Bar-B-que," or others. Common misspellings of words (e.g., "Barbaque") may be—but in general, need not be—considered equivalent to their properly-spelled counterparts. Similarly, geographic or cultural differences in spelling (e.g., British English vs. American English) may be considered synonymous. In some cases, there may only be a single word in a synonym class. Synonym classes can be useful to standardize an existing database.

Figure 4:
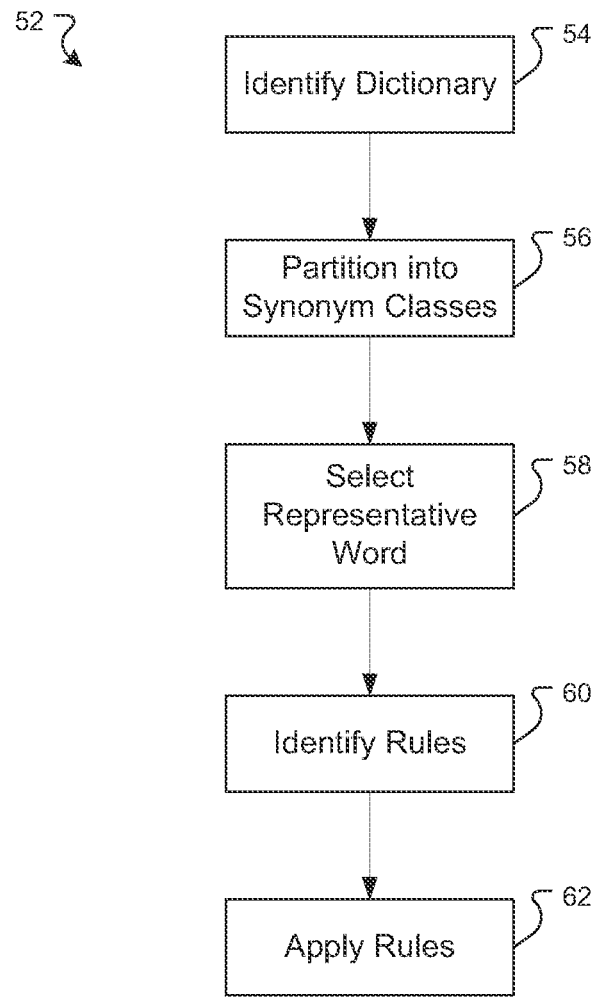
FIG. 4 is a flowchart for standardizing a database.

FIG. 4 shows a flowchart for standardizing an existing database. The process 52 can apply to any database, including an entirely non-standardized database, a partially-standardized database, etc. (Here, a "partially standardized" database means a database to which some rules have been applied, but not to the extent to implement a desired level of standardization. For example, a database in which all instances of "&" have been replaced by "and," but no other standardization has taken place, may be considered partially standardized.)

In step 54, a dictionary of values is identified. This dictionary includes each value that appears in at least one attribute for at least one record in the database. In some implementations, the dictionary could also separately include each word that appears in each value. Thus, for example, an attribute having a multi-word phrase as a value (e.g., "bleu cheese") can contribute three terms to the dictionary: "bleu cheese," "bleu," and "cheese."

In step 56, the dictionary is partitioned into synonym classes. For example, one such synonym class might include "BBQ," "Barbecue," "Barbeque," "Barbaque," etc. If a synonym class depends on context, the context can be included in the replacement rule as described above. For example, if "reg." is treated as synonymous with "regular" in some contexts but synonymous with "regional" in others, then those differing conditions can be provided in the definition of synonym classes as well. For example, the conditions can be provided based on the values of other attributes of the product.

Next, a representative word from each synonym class is selected (step 58). For example, "BBQ" may be selected as the representative word of its synonym class. In some implementations, the selection of a representative word is arbitrary. Thus, for example, "Barbecue" or even "Barbaque" could just as easily have been selected as the representative word for that synonym class. In some implementations, the representative word is selected with some other goal in mind, such as minimizing the length of the representative word, favoring or disfavoring capital letters, etc.

In step 58, rules are identified the replace each word in a synonym class with the representative word. In the example above, with "BBQ" as the representative word of its synonym class, then four other rules are identified with respect to that synonym class: replacing each of "Barbaque," "Bar-B-Que," "Barbecue," and "Barbeque," with "BBQ."

If any synonym classes depended on context (as in the "reg." example above), then the context can also be used to define the scope of the rule. For example, one rule might replace "reg." with "regional" only if the "manufacturer" attribute has a particular value, while another rule might replace "reg." with "regular" unless the "manufacturer" attribute has that particular value.

Once the rules are identified, the rules are applied to each product in the database. As described above, it may be desirable to apply the rules numerous times to effectuate the desired result.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In some embodiments disclosed herein are computer program products comprising computer-executable code or computer-usable code that, when executing on one or more computing devices (such as the devices/systems described above), performs any and/or all of the steps described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The meanings of method steps of the invention(s) described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

Thus for example, a description or recitation of "adding a first number to a second number" includes causing one or more parties or entities to add the two numbers together. For example, if person X engages in an arm's length transaction with person Y to add the two numbers, and person Y indeed adds the two numbers, then both persons X and Y perform the step as recited: person Y by virtue of the fact that he actually added the numbers, and person X by virtue of the fact that he caused person Y to add the numbers. Furthermore, if person X is located within the United States and person Y is located outside the United States, then the method is performed in the United States by virtue of person X's participation in causing the step to be performed.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A system for transforming a database of products, the system comprising:
   a first data storage medium storing a raw product database that describes a plurality of products, wherein the raw product database includes, for each of the plurality of products, attributes associated with the products, wherein each attribute has a value that includes a word;
   one or more processors;
   a second data storage medium bearing instructions that, when executed on the one or more processors, cause the one or more processors to process the raw product database to provide a standardized data structure that contains standardized values for the attributes of the products for improved analytics by performing the steps of:
   identify a dictionary comprising each word that appears as a value of at least one attribute of at least one product in the raw product database;
   partition the dictionary into synonym classes of words, each synonym class forming an equivalence class of mutually equivalent terms for a product attribute, wherein when one of the values appears in two or more synonym classes, the value is stored with a context for differentiating between the two or more synonym classes;
   select a representative word from each of the synonym classes, thereby associating each word in the dictionary with a corresponding representative word;
   identify a collection of replacement rules, each of which replaces a target word from one of the synonym classes with the corresponding representative word, wherein the replacement rules comprise global rules, multi-word phrase rules, attribute constant rules, and single-word replacement rules; and
   for each product in the raw product database, apply the replacement rules to one or more attributes of the product, thereby producing a standardized product database, wherein the global rules are applied before the multi-word phrase rules, the multi-word phrase rules are applied before the attribute constant rules, and the attribute constant rules are applied before the single-word replacement rules, wherein the replacement rules include at least one replacement rule for numerical values that is applied sequentially and repeatedly until a predetermined stopping condition is reached.

2. The system of claim 1, further comprising instructions that cause the one or more processors to:
   use the replacement rules, replacing each word in the dictionary with its corresponding representative, thereby producing a standardized dictionary;
   add a new record to the standardized product database corresponding to a new product, wherein the new record includes attribute fields; and
   select values for the attribute fields from the standardized dictionary.

3. The system of claim 1, further comprising instructions that cause the one or more processors to:
   define synonym classes of phrases in the dictionary.

4. The system of claim 1, in which the rules are applied repeatedly until a pre-determined condition is met.

5. The system of claim 4, in which the pre-determined condition includes the conditions that:
   each rule is applied at once, and
   there occurs an iteration of applying each of the rules such that the rules collectively fail to change at least one attribute value.

6. The system of claim 4, in which the pre-determined condition includes application of the rules a pre-determined number of times.

7. The system of claim 2, in which the new record is added based on detecting a new product in external data selected from the group consisting of: sales data from a retail outlet, inventory data from a retail outlet, a new product announcement from a media outlet, and a communication from a product manufacturer or affiliate.

8. The system of claim 2, in which adding the new record includes:

automatically identifying a preliminary record based on raw external data;

applying the replacement rules to the preliminary record, thereby producing a transformed record;

submitting the transformed record to a human for review;

in response to human input, discarding the transformed record and receiving a new replacement rule from the human; and applying the new replacement rule to the preliminary record, thereby producing the new record.

9. The system of claim 1 wherein the context includes one or more other values for one or more other attributes of the one of the plurality of products associated with the value of the attribute.

10. The system of claim 1 wherein the multi-word phrase rules are applied in increasing order of length of phrase.

11. The system of claim 1 wherein the multi-word phrase rules are applied in decreasing order of length of phrase.

12. The system of claim 1 wherein at least one of the synonym classes includes one or more common misspellings of a word.

13. The system of claim 1 wherein at least one of the synonym classes depends on context that determines a scope of a replacement rule for the one of the synonym classes.

14. The system of claim 2 further comprising a camera for acquiring a product image for the new product.

15. The system of claim 14 wherein the new record and the product image are sent to a human for review before adding the new record to the standardized database.

16. The system of claim 14 wherein the product image is scraped to identify product information for use as product attributes in the standardized database.

17. The system of claim 16 wherein the product information includes text extracted from the product image using optical character recognition.

18. The system of claim 16 wherein the product information includes image features detected in the product image.

19. The system of claim 16 wherein the product information includes a brand name or a logo.

\* \* \* \* \*